United States Patent

Schott

[11] 4,054,004
[45] Oct. 18, 1977

[54] WEEDLESS FISHING LURE

[76] Inventor: William Donald Schott, 150 Dexter Drive, Monroeville, Pa. 15146

[21] Appl. No.: 703,954

[22] Filed: July 9, 1976

[51] Int. Cl.² .............................. A01K 85/00
[52] U.S. Cl. ................... 43/42.09; 43/42.06; 43/42.1; 43/42.31; 43/42.39
[58] Field of Search .................. 43/42.09, 42.1

[56] References Cited

U.S. PATENT DOCUMENTS

| 2,261,068 | 10/1941 | Mackovich | 43/42.1 |
| 2,558,397 | 6/1951 | Toner, Jr. | 43/42.1 |
| 2,994,982 | 8/1961 | Murawski | 43/42.1 X |

Primary Examiner—Russell R. Kinsey
Assistant Examiner—Daniel J. Leach
Attorney, Agent, or Firm—Robert D. Yeager; Robert DeMajistre

[57] ABSTRACT

A fishing lure is comprised of a hollow semi-rigid body of uniform wall thickness formed from a plastic tube. The lure has a head which is removably mounted to the body. A hook is provided within the body and in alignment with an aperture in the body. When a fish strikes the lure, the body collapses and exposes the hook to impale the fish thereon.

9 Claims, 7 Drawing Figures

WEEDLESS FISHING LURE

BACKGROUND OF THE INVENTION

1. Field of the Invention

This invention relates to artificial fishing lures and more particularly to artificial fishing lures with an enclosed hook for the prevention of snagging and the like.

2. Description of the Prior Art

Artificial fishing lures have found extensive use in both sport and commercial fishing. Usually the lure is made to resemble an edible water creature such as a fish, frog or the like which is attractive as food to the fish to be caught. The lure is usually rigged on the outside body thereof with a hook or a plurality of hooks to impale the fish when the fish attempts to feed on the lure.

However, the hooks affixed to the exterior of the lure tend to snag on logs, algae, rocks and other debris on the bottom of a body of water. Because of the snagging problem, there have been extensive attempts to provide a lure which encloses the hook while fishing and releases the hook when the fish strikes, thus impaling the fish on the hook.

Another problem associated with fishing lures and exposed fishing hooks generally is their tendency to snag on the fisherman's clothing, flesh, equipment and the like. This problem is another impetus for the pursuit of a fishing lure with an enclosed hook.

In fishing terminology lures having closures on the hooks to prevent snagging are called "weedless lures".

There have been many attempts to produce weedless lures which have met with varying degress of success. Among these attempts have been lures which enclose the hook in a flexible body and expose the hook when the fish strikes. Many of these lures are effective and perform their desired functions. However, even the effective lures suffer from such defects as lack of durability, complex mechanical hook actuating devices, partially effective fish impaling, and relatively high manufacturing costs due to complex configurations among other deficiencies.

In addition, lures generally are formed by permanently mounting the constituent parts thereof. Thus, if one of the parts is damaged, the entire lure must be discarded.

Exemplary of attempts to provide weedless lures are those described in U.S. Pat. Nos. 2,261,068; 1,786,568; 1,846,538; 2,016,960; 3,748,774; 3,230,656; 1,110,956; 534,506; 2,027,069; 2,558,397; and 2,520,544.

In accordance with the present invention a fishing lure is provided which is weedless, which has replacable and interchangeable parts, and is extremely low in cost.

BRIEF DESCRIPTION OF THE INVENTION

The fishing lure of the invention is comprised of a hollow semi-rigid body or uniform wall thickness formed from a plastic tube, having a head which is removably secured to the body through a cap. A hook is mounted in alignment with an aperture in the body. The hook is integrally formed with aan eyelet which is positioned on the exterior of the lure, preferably at the head end. A means for fixing the position of the hook in relation to the body is associated with the hook and eyelet.

The following drawings will further illustrate the invention.

DETAILED DESCRIPTION OF THE DRAWINGS

Figure 1:
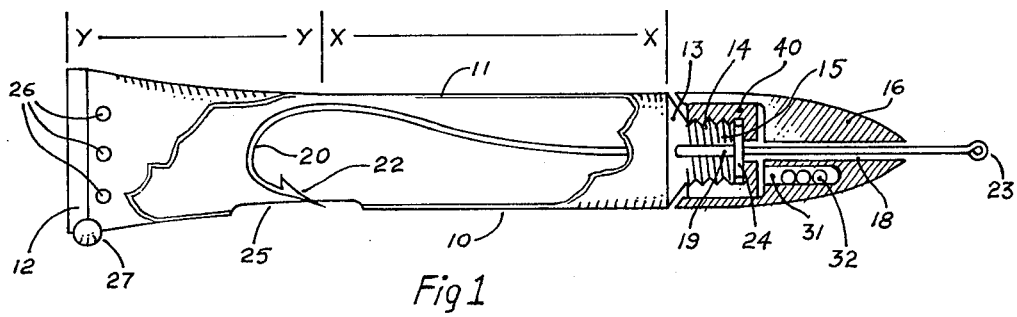
FIG. 1 is a side view of an embodiment of the invention with parts broken away.
Figure 2:
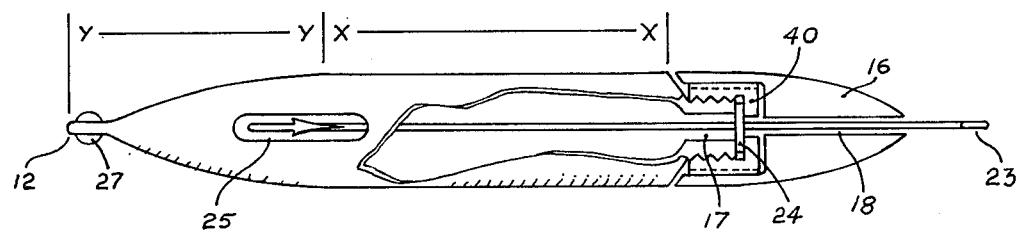
FIG. 2 is a bottom view of the embodiment of FIG. 1 with parts broken away.
Figure 3:
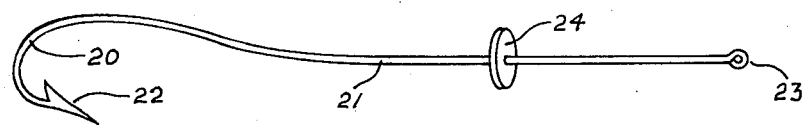
FIG. 3 is a side view of the hook and eyelet arrangement.
Figures 4, 5:
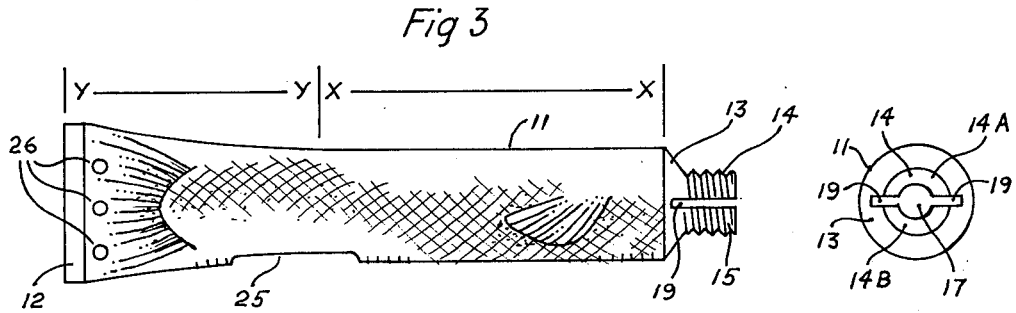
FIG. 4 is a side view of the body of the embodiment shown in FIGS. 1 and 2.
FIG. 5 is a front view of the body shown in FIG. 4.
Figure 6:
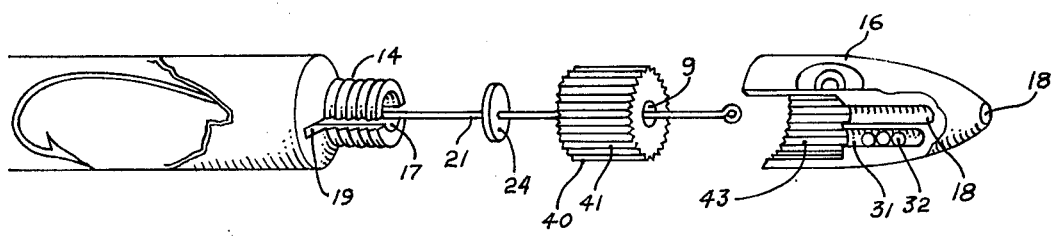
FIG. 6 is an exploded view of the component parts of the lure.

Referring now to FIGS. 1 through 7 where like parts are referred to with like reference numbers, the lure is generally designated by the numeral 10. Lure body 11 is constructed of a semi-rigid plastic resilient material which is preferably non-elastomeric. By 'non-elastomeric' is meant incapable of stretching greater than 10% in any single direction and returning to its original dimension. By 'semi-rigid' is meant having sufficient rigidity to maintain a predetermined shape but capable of deviation from the predetermined shape with a slight application of pressure. By 'resilient' is meant capable of deviating from a predetermined shape with the application of pressure and capable of returning to the original predetermined shape after the pressure is released. All of the above definitions are applicable at ambient temperatures, i.e., those which the lure will encounter during use.

The lure body 11 is constructed of a plastic such as polyethylene, polypropylene, plasticized polyvinyl chloride or a similar plastic having the necessary characteristics referred to above. To obtain the semi-rigid resilient properties necessary for the lure body the wall thickness of the body should be between about 0.1 and 1 millimeter and preferably 0.2 to 0.3 millimeters. In the embodiments shown in FIG. 1 and following the body wall thickness is 0.25 millimeters.

The hollow body 11 is generally tubular along the x—x portion thereof and becomes elliptical between the y—y portion due to the joining of the wall sections at the end of the body at weld joint 12. The varying of the body from circular to elliptical simulates the shape of a bait fish. At the front of the body 11 is a shoulder 13 which converges into a neck 14 equipped with male threads 15. The cap 40 has female threads matching threads 15. The cap 40 may be constructed of plastic, metal, wood or a similar material.

An aperture 17 is provided in neck 14 which provides access to the interior of hollow body 11, and cap 40 has an aperture 9 which aligns with aperture 17. An opening 18 is provided in the center of head 16 which aligns with apertures 17 and 9. The neck 14 of body 11 has a slot 19 along the diameter thereof allowing separation of the two neck portions 14A and 14B.

A hook 20 is enclosed in body 11 and is untiary with shaft 21. A barb 22 is on the hook 20 for maintaining the impalement of a fish thereon. Shaft 21 traverses the body 14 through neck aperture 17 and cap aperture 9 and through opening 18 in head 16. The shaft 21 is equipped with eyelet 23 for tying the lure to a fishing line. A disk 24 is permanently mounted on shaft 21 by soldering or a like method. The disk 24 is of a diameter greater than aperture 17 and less than the neck engaging portion of the cap 40. Thus when the cap 16 is screwed onto neck 14, the disk 24 is between the cap interior head and the neck and fixed in position with relation to the body 11.

A slot 25 is provided in body 11 proximate to the hook 20 so that when a fish compresses the body 11 the hook 20 traverses the slot 25 and is exposed to impale the fish. The hook 20 along with slot 25 is positioned between one-eighth the length of the body 11 from the head direction and one-fourth the length of the body 11 from the rear direction, and more preferably, between one-half the length of the body 11 from the head direction and one-fourth the length of the body from the rear direction. This positioning is necessary because the weld 12 impedes flexure in the rearward portion of the body 11 and the neck 13 impeds flexure of the body 11 in the forward portion of the lure. It is desirable to position the hook 20 along with slot 25 as far to the rear as possible because in most instances the game fish will attack the lure from the rear.

Holes 26 are provided preferably in the rear of the body 11 to allow water to enter and air to leave the body at a more rapid rate than through slot 25 above. Hole 26 also causes the lure to effect a diving and bubbling action which aids in attracting game fish.

Split shot sinkers 27 may be engaged near the weld 12 on body 11 or a strip of lead may be welded in position at the same time the rear end of the lure is welded to provide additional weight to the lure 10.

Figure 7:
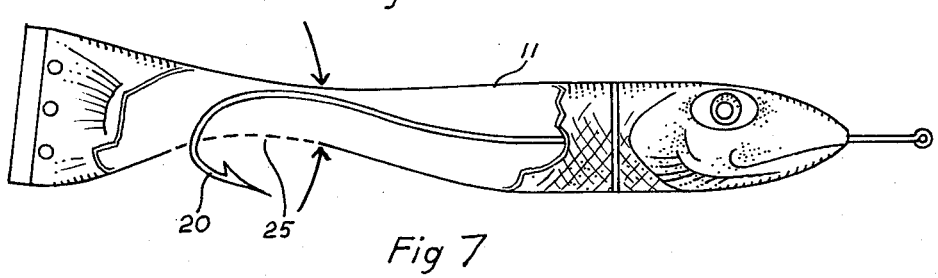
FIG. 7 is a side view of the lure body flexing when the fish strikes the lure.

In FIG. 7, the lure is shown as it responds to a fish attempting to feed on the lure. The wall of the lure body 11 collapses in response to the pressure of the fish's mouth attempting to eat the lure. The hook 20 traverses the slot 25 and impales the fish.

In assembling the lure, the integral hook 20, eyelet 23 and disk 24 is inserted hook first through aperture 17 in neck 14. Neck sections 14A and 14B separate due to slot 19; this separation enables the large hook 20 to enter the body 11 easily. The shaft 21 along with the hook 20 is inserted in the body until disk 24 engages neck 14. The hook 20 is then aligned with slot 25 in lure body 11 and held in place with the thumb and forefinger. The cap 40 is placed on the forward portion of shaft 21 by insertion through aperture 9 and cap 40 and is threaded onto the neck 14.

As can be readily observed, the component parts of the lure 10 are readily interchangeable with other lures of corresponding size. Further the lure can be readily disassembled into its component parts.

In this embodiment of the invention the head 16 is provided with a compartment 31 which can be filled with metal shot 32 such as BBs or the like. The shot 32 not only adds additional weight to the head of the lure but also causes noise which is desirable in some cases to attract fish to the lure. Additionally, the compartment 31 can be filled with weights to provide a heavier lure.

The lure body is constructed of a squeeze tube which is currently used to contain and dispense shampoo, cosmetics or a like material. These tubes are readily commercially, available and are low in cost due to high volume production of such tubes and low cost plastic material.

The lure body 11 is fitted with cap 40 which has a plurality of striations 41 perpendicular to the diameter of the cap. These striations are normally formed in such caps for gripping to open the squeeze tube. In this embodiment of the invention, a head 16 is equipped with matching striations 43 on the interior thereof to frictionally engage the striations in the cap 40. This technique of head mounting on the lure is desirable because the printing on the tubes is conducted separately from the printing on the head. By matching the striations of the cap and head, the head and body can be accurately aligned for a printing match.

A primary advantage of the invention is the simplicity of manufacture of the lure. The tube forming the lure body is cut from a length of continuously extruded plastic tubing. After the tube is cut, a neck 14 with threads 15 is formed at the front of the tube. The tube is then welded at the end to form weld joint 12. After the conventional tube is formed, slot 25 can be formed and the hook, with the shaft and disk can be inserted, the cap is placed on the shaft and threaded on to frictionally seal the washer and fix the position of the hook in relation to the lure body and the head is mounted on the cap.

As can be readily observed by the previous disclosure and accompanying drawings, a wide variation of sizes of lures and adaptation to the head can be made. Thus, although the invention has been described with reference to specific embodiments, the invention is to be limited only so far as is set forth in the accompanying claims.

What is claimed is:

1. A weedless fishing lure comprising:
   a. a hollow semi-rigid resilient body having a substantially uniform wall thickness;
   b. a threaded neck integrally formed with said body;
   c. a head threaded on said neck;
   d. a hook enclosed within said body;
   e. an aperture in the wall of said body, said hook and said aperture being in substantial alignment to provide for exposure of the hook when said body is flexed;
   f. means for removably fixing the position of said hook and said aperture with relation to each other including a disk permanently mounted to said hook, said disk being frictionally fixed between said head and said threaded neck; and
   g. means for attaching said lure to a fishing line.

2. The lure of claim 1 wherein said body is non-elastomeric.

3. The lure of claim 1 wherein said body is cylindrical at the head end thereof and is elliptical towards the rear end thereof.

4. The lure of claim 1 wherein said body is welded at the rear thereof to provide a closure within said body.

5. The lure of claim 1 wherein said hook, said means for removably fixing the position of said hook, and said means for attaching said lure to a fishing line are integral with each other.

6. The lure of claim 1 wherein said means for attaching said lure to a fishing line is an eyelet at the exterior of said lure.

7. A weedless fishing lure comprising:
   a. a hollow sem-rigid resilient body being welded at the rear end thereof, said body having a substantially uniform wall thickness;
   b. a threaded neck integrally formed with said body;
   c. a cap threaded on said body having longitudinal striations thereon;
   d. a head having longitudinal striations within it interior matching the longitudinal striation on said cap to provide a frictional seal between said head and said cap;

e. a hook enclosed within said body;

f. an aperture in the wall of said body, said hook and said aperture being in substantial alignment to provide for exposure of the hook when said body is flexed;

g. means for removably fixing the position of said hook and said aperture with relation to each other; and h. means for attaching said lure to a fishing line.

8. The lure of claim 7 wherein said body is non-elastomeric.

9. The lure of claim 7 wherein said body is cylindrical at the head end thereof and is elliptical towards the rear end thereof.

* * * * *

UNITED STATES PATENT AND TRADEMARK OFFICE
CERTIFICATE OF CORRECTION

PATENT NO. : 4,054,004
DATED : October 18, 1977
INVENTOR(S) : William D. Schott

It is certified that error appears in the above-identified patent and that said Letters Patent are hereby corrected as shown below:

Column 1, line 58, "or" should read --of--; line 62, "aan" should read --an--.

*Signed and Sealed this*

*Seventeenth* Day of *January 1978*

[SEAL]

Attest:

RUTH C. MASON
*Attesting Officer*

LUTRELLE F. PARKER
*Acting Commissioner of Patents and Trademarks*